US011983695B1

(12) United States Patent
Russell et al.

(10) Patent No.: US 11,983,695 B1
(45) Date of Patent: May 14, 2024

(54) AUTHENTICATION OF A REMOTE CUSTOMER USING PROBABILISTIC LOCATIONS OF WIFI SIGNALS

(71) Applicant: UIPCO, LLC, San Antonio, TX (US)

(72) Inventors: Ryan Thomas Russell, The Colony, TX (US); Gregory Brian Meyer, San Antonio, TX (US); Steven Michael Bernstein, San Antonio, TX (US); David Ira Waters, Jr., San Antonio, TX (US); Patrick Michael Luberus, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 54 days.

(21) Appl. No.: 17/333,970

(22) Filed: May 28, 2021

Related U.S. Application Data

(60) Provisional application No. 63/033,303, filed on Jun. 2, 2020.

(51) Int. Cl.
*G06Q 20/32* (2012.01)
*G06Q 20/10* (2012.01)
*G06Q 20/40* (2012.01)
*H04L 9/40* (2022.01)
(Continued)

(52) U.S. Cl.
CPC ......... *G06Q 20/325* (2013.01); *G06Q 20/108* (2013.01); *G06Q 20/4014* (2013.01); *H04L 63/083* (2013.01); *H04W 12/068* (2021.01); *H04W 12/08* (2013.01); *H04L 2463/082* (2013.01)

(58) Field of Classification Search
CPC ............... G06Q 20/325; G06Q 20/108; G06Q 20/4014; H04L 63/083; H04L 2463/082; H04W 12/068; H04W 12/08
See application file for complete search history.

(56) References Cited

U.S. PATENT DOCUMENTS

| 7,503,489 B2 * | 3/2009 | Heffez | G06Q 20/4014 |
| | | | 235/382 |
| 8,646,060 B1 * | 2/2014 | Ben Ayed | H04W 4/20 |
| | | | 726/9 |
| 9,730,015 B1 * | 8/2017 | Lee | H04W 64/00 |

(Continued)

OTHER PUBLICATIONS

J.A.R.N. Chandrathilaka, "Location Based Authentication Using Wi-Fi Signal Strength", "University of Colombo School of Computing Sri Lanka", 2018, iii and pp. 10-43.*

*Primary Examiner* — Christopher Bridges
*Assistant Examiner* — Tony P Kanaan
(74) *Attorney, Agent, or Firm* — Plumsea Law Group, LLC

(57) ABSTRACT

The embodiments disclosed herein use WiFi signals detected from nearby WiFi networks to confirm the identity of a bank's customer logging in to his or her account at the bank. Specifically, the customer's computing device may detect signals from neighboring WiFi networks. The bank may then verify that the customer's accounts are being accessed from the customer's home or office by comparing the list of neighboring WiFi networks to a previously stored list of the neighboring networks. If the lists match, it is probable that the customer's accounts are being accessed from the customer's home or office, thus reducing the possibility that a fraudulent actor is trying to access the customer's accounts.

19 Claims, 12 Drawing Sheets

(51) Int. Cl.
    *H04W 12/06*     (2021.01)
    *H04W 12/08*     (2021.01)

(56) References Cited

U.S. PATENT DOCUMENTS

| | | | | |
|---|---|---|---|---|
| 10,085,122 | B2 * | 9/2018 | Howe | H04W 4/021 |
| 10,812,494 | B2 * | 10/2020 | Biehl | H04L 63/107 |
| 11,288,677 | B1 * | 3/2022 | Burger | G06Q 20/405 |
| 2013/0091042 | A1 * | 4/2013 | Shah | G06Q 40/02 |
| | | | | 705/325 |
| 2014/0119356 | A1 * | 5/2014 | Huang | H04W 12/08 |
| | | | | 370/338 |
| 2014/0302785 | A1 * | 10/2014 | Arora | H04W 12/08 |
| | | | | 455/41.2 |
| 2016/0050209 | A1 * | 2/2016 | Govande | H04L 63/101 |
| | | | | 726/7 |
| 2016/0316371 | A1 * | 10/2016 | Chen | H04W 12/08 |
| 2017/0098216 | A1 * | 4/2017 | Studnitzer | G06Q 20/4014 |
| 2017/0126682 | A1 * | 5/2017 | Wong | H04W 12/069 |
| 2017/0187703 | A1 * | 6/2017 | Enrique Salpico | H04L 63/162 |
| 2017/0222996 | A1 * | 8/2017 | Adams | H04L 63/0846 |
| 2017/0279971 | A1 * | 9/2017 | Raleigh | H04W 60/06 |
| 2017/0295470 | A1 * | 10/2017 | Howe | G06Q 20/3224 |
| 2018/0167812 | A1 * | 6/2018 | Nagarajamoorthy | H04W 4/80 |
| 2020/0082108 | A1 * | 3/2020 | Griffin | G06F 21/44 |
| 2020/0145294 | A1 * | 5/2020 | Saghir | H04L 63/166 |
| 2020/0402049 | A1 * | 12/2020 | Pi Farias | G06Q 20/208 |
| 2021/0081923 | A1 * | 3/2021 | Rafferty | H04L 63/102 |
| 2021/0144150 | A1 * | 5/2021 | James | H04W 12/08 |
| 2022/0116344 | A1 * | 4/2022 | Kaidi | G06Q 20/3255 |

* cited by examiner

AUTHENTICATION OF A REMOTE CUSTOMER USING PROBABILISTIC LOCATIONS OF WIFI SIGNALS

CROSS-REFERENCE TO RELATED APPLICATIONS

This application claims the benefit of Provisional Patent Application No. 63/033,303, filed Jun. 2, 2020, and titled "Authentication of a Remote Customer Using Probabilistic Locations of WiFi Signals," which is incorporated by reference herein in its entirety.

TECHNICAL FIELD

This disclosure relates to enhancing the security of transactions from accounts at financial institutions that are initiated from a remote device.

BACKGROUND

Many customers of financial institutions such as banks, savings and loans, credit unions and other financial institutions prefer to conduct a substantial proportion of their transfers from their accounts at the financial institutions from a remote location, using an electronic device such as a computer, a desktop computer, a laptop computer, a tablet and a smart phone. The customers may initiate many of such transfers from locations such as the customers' homes or the customers' workplaces. In many typical cases, the financial institution may require the customer to enter a password as well as also entering his or her customer name for the account as a means for verifying the customer's identity. Unfortunately, in some cases fraudulent actors have succeeded in overcoming these precautionary measures by using any one of several illegal or unethical means. For example, a fraudulent actor may look over a customer's shoulder while the customer is accessing his or her account online.

For these reasons, there is a need for robust methods of making sure that the person requesting a transfer of funds is indeed a person authorized to make such requests before allowing the funds to be transferred.

SUMMARY

In one aspect, embodiments include a system for authenticating a customer of a bank attempting to access one of the customer's accounts at the bank. The system has a server at the bank that is configured to be in communication with a router located at premises associated with the customer. The server is configured to receive communications from the router. An app housed in the server is configured to retrieve a stored list of wireless networks that were previously detected by the router. When the server receives a request from the customer for the transfer of funds from one of the customer's accounts to a third party, the server also receives a current list of wireless networks currently detected by the router. The app is configured to compare the current list of wireless networks to the stored list of wireless networks, and to determine whether the current list matches the stored list at least in part. If the app determines that the current list fully matches the stored list, the app authorizes the customer's request for the transfer of funds.

In another aspect, embodiments include a system for providing a customer with access to the customer's accounts at a bank that includes a customer's computing device configured to detect wireless networks broadcast by neighboring routers. In that case, the computing device has previously transmitted a list of the wireless networks broadcast by routers in neighboring premises to a server at the bank. Whenever the customer accesses the customer's accounts at the bank to submit a request for a transfer of funds, the computing device transmits a current list of the wireless networks broadcast by routers in neighboring premises to the server at the bank, and the server also receives a current synthetic password. Whenever the current list of wireless networks broadcast by routers in neighboring premises fully matches the previously transmitted list of wireless networks broadcast by routers in neighboring premises and the currently received synthetic password matches a previously stored synthetic password within pre-established tolerances, the customer receives confirmation that the request for the transfer of funds has been authorized.

In yet another aspect, embodiments include a method for protecting a customer's accounts at a bank from being accessed by fraudsters that includes obtaining a list of wireless networks detected by a customer's computing device, and storing that list of wireless networks as a stored list of wireless networks on a server at the bank. The server then obtains a current list of wireless networks detected by the customer's computing device whenever an app at the bank's server determines that an attempt is being made to transfer funds from the customer's account. The server then compares the current list of wireless networks detected by a customer's computing device to the stored list of wireless networks detected by a customer's computing device. It then determines if there is a full match, no match or a partial match between the current list of wireless networks detected by a customer's computing device and the stored list of wireless networks detected by a customer's computing device. The server then authorizes full access to the customer's account whenever there is a full match.

BRIEF DESCRIPTION OF THE DRAWINGS

The embodiments disclosed herein may be better understood with reference to the following listed drawings and their descriptions. The components in the drawings are schematic rather than representational, and are not necessarily to scale, the emphasis of the disclosure being placed upon illustrating the purpose of implementing the systems and methods disclosed herein. Moreover, in the drawings like reference numerals designate corresponding parts throughout the drawings.

DESCRIPTION OF EMBODIMENTS

Figure 1:
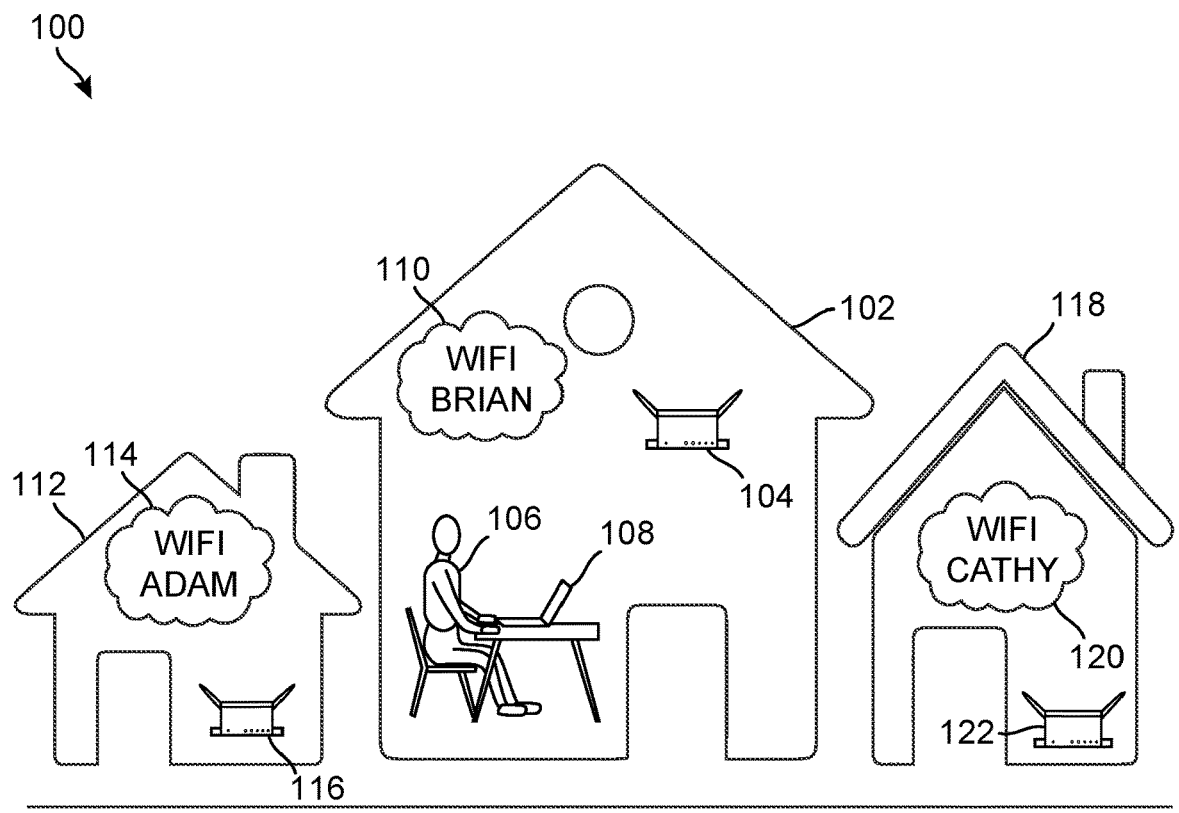
FIG. 1 is an illustration of an exemplary context of a method for verifying a customer's identity by identifying nearby WiFi networks, in an embodiment.
Figure 1:
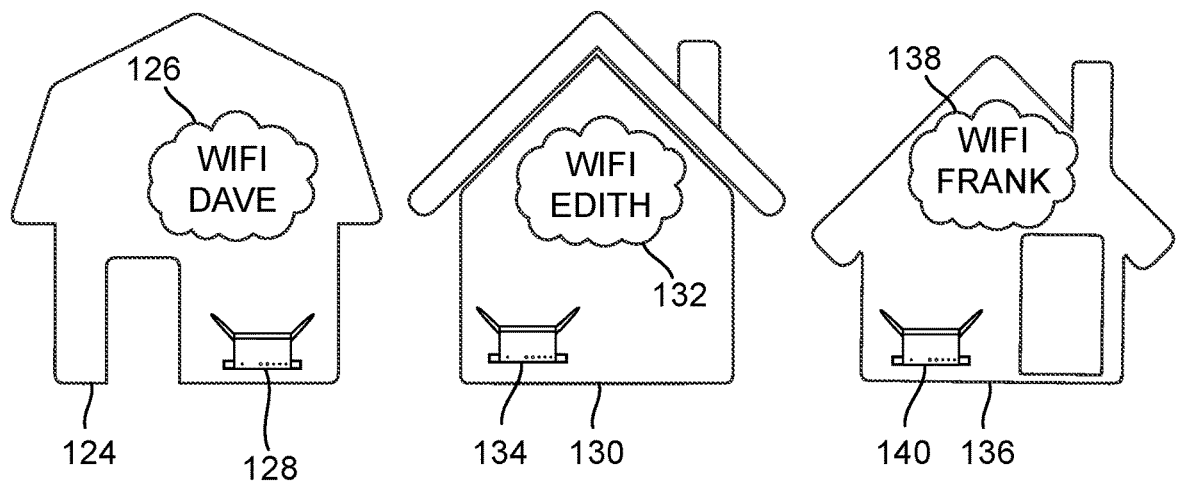

The embodiments disclosed herein provide systems and methods for authenticating the identity of customers of a financial institution based upon a probabilistic location derived from identification of the WiFi signals detected by the customers' computing devices.

As used herein, the term "computing device" shall include, without limitation, desktop computers, laptop computers, tablets, smartphones and other devices that have a display, a means of entering data, and are capable of communicating with a remote institution. The terms "financial institution" and "bank" are used interchangeably herein and shall include, without limitation, banks, saving and loans, credit unions, investment firms, stockbrokers and other financial institutions that maintain accounts on behalf of their customers. The term "customer's premises" shall refer to either or both of the customer's home and the customer's office at work, and the term "home" shall include a separate house, a townhouse, a rental apartment, a condo apartment and other residences.

The embodiments disclosed herein use WiFi signals detected from nearby WiFi networks to confirm the identity of a customer logging in to his or her account at a financial institution. For example, if the customer is accessing his or her accounts at the financial institution from the customer's home, the customer's computing device may detect signals from neighboring WiFi networks. The financial institution may then verify that the customer's accounts are being accessed from the customer's home by comparing the list of neighboring WiFi networks to a previously stored list of the neighboring networks. If the lists match, it is probable that the customer's accounts are being accessed from the customer's home, thus reducing the possibility that a fraudulent actor is trying to access the customer's accounts. In some cases, customers may do some of their online banking from a work office; in that case, the financial institution may compare a current list of nearby office WiFi networks, for example, to a previously-stored list of nearby office WiFi networks.

In some embodiments, the authentication of the customer may also include a comparison of a synthetic password for the customer's account to a stored synthetic password. The synthetic password may be generated from a concatenation of the neighboring networks' names and their relative signal strengths, for example, as described below.

The customer may establish a set of policies or rules governing the transfers of funds from the customer's accounts. For example, the policies may require the financial institution to only allow transfers of funds if the list of current and stored WiFi networks match. In some embodiments, the rules may require comparisons of synthetic passwords as well. In other cases, the policies may allow transfers up to a modest amount (for example, up to $250) even when the lists do not match, but would prohibit funds transfers in larger amounts if the lists do not match. That would allow the customer to transfer funds when he or she is not at home or at the office, with a limited risk of, for example, $250 or less.

In yet other cases, the maximum amount being transferred could be limited according to the identity of the payee. For example, if purchases from a certain payee are typically well under $100, the customer may specify that any transactions to that specific payee of $100 or less would be allowed to go through, while transactions above $100 would be denied. Depending on how much effort the customer may be willing to put into such an effort, the customer may specify the maximum amount for payments to each of a number of payees.

FIG. 1 is a schematic diagram 100 illustrating a context in which a system and method for authenticating a customer's identity by identifying nearby WiFi signals may be used. Each WiFi network shown in the figures may be identified by its Service Set Identifier (referred to below its SSID). FIG. 1 shows six such home local area networks. Thus, in house 102, a customer 106 is at home connecting to his bank using a laptop computer 108. Laptop computer 108 is connected to WiFi network "WIFI BRIAN" 110 via a router 104. House 102 is surrounded by five neighboring houses, house 112, house 118, house 124, house 130, and house 136. WiFi network with SSID "WIFI ADAM" 114 is broadcast by router 116 inside house 112; WiFi network with SSID "WIFI CATHY" 120 is broadcast by router 122 inside house 118; WiFi network with SSID "WIFI DAVE" 126 is broadcast by router 128 inside house 124; WiFi network with SSID "WIFI EDITH" 132 is broadcast by router 134 inside house 130; and WiFi network with SSID "WIFI FRANK" 138 is broadcast by router 140 inside house 136.

Owing to the proximity of the neighboring routers, such as router 116, router 122, router 128, router 134, and router 140, the WiFi adapter in laptop 108 detects their associated WiFi networks even though laptop 108 only has the encryption to actually connect to WiFi network WIFI BRIAN 110. Typical WiFi routers that might be found in houses generally have effective ranges of about few hundred feet or less. Therefore, reading the list of WiFi networks detected by a WiFi adapter may be used to identify the general location of a home customer's router, even though the home customer's laptop cannot actually connect to these neighboring WiFi networks.

Figure 2:
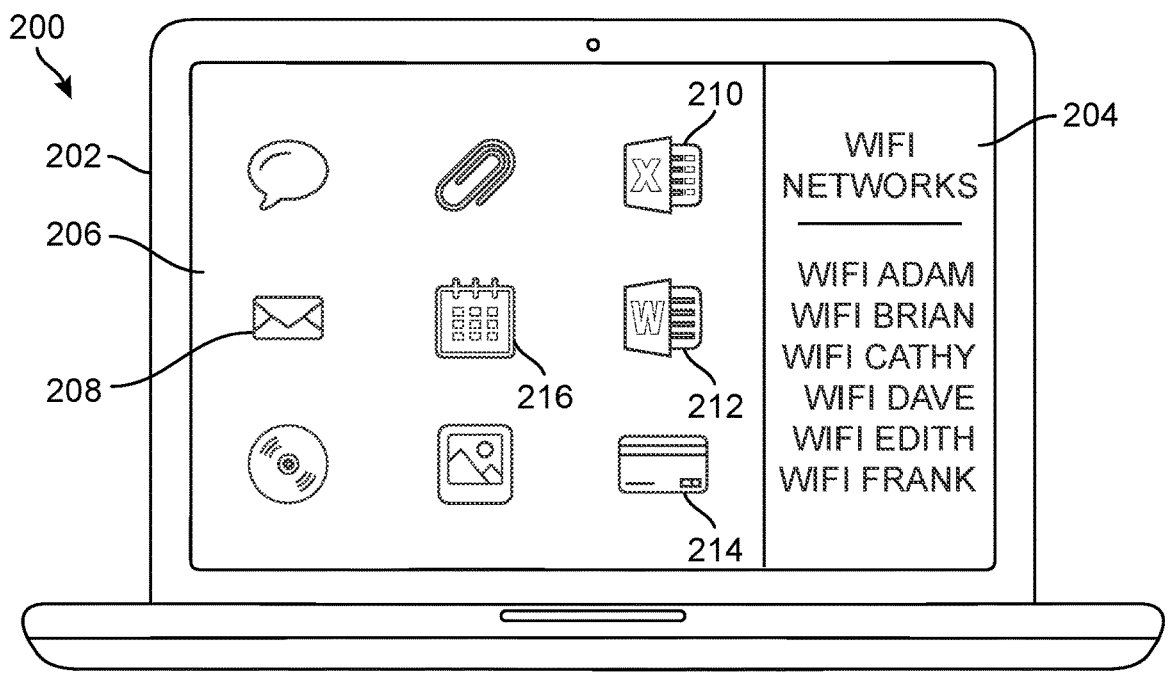
FIG. 2 is a schematic drawing showing the communications between a bank and a customer in a home environment, in an embodiment.
Figure 2:
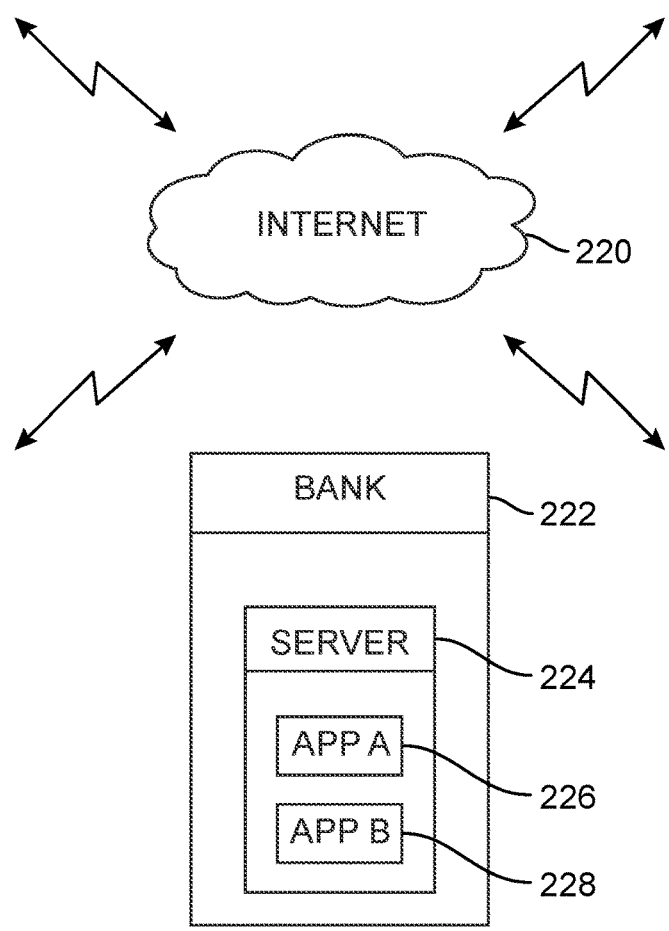

FIG. 2, FIG. 3, FIG. 4 and FIG. 5 illustrate embodiments that may be used to authenticate the router used to access, for example, a customer's bank account. FIG. 2 is a schematic diagram 200 showing a server 224 that uses the WiFi signals detected by a customer's computing device 202 to authenticate a router and thus to confirm the customer's identity. Computing device 202 (which in some embodiments may be a desktop computer, a laptop computer, a tablet, a smart phone or some other computing device), includes a display 206 which shows an exemplary set of software applications including, in this example, an email client 208; a calendar application 216; a banking application 214; a word processing application 212; and a spreadsheet application 210, as well as some other applications. A WiFi adapter detects a set of WiFi networks 204 which are shown on display 206. In this embodiment, the detected set of WiFi networks 204 come from nearby WiFi routers, as well as from the home owner's router. Banking application 214 allows a customer using computing device 202 to access a bank account associated with the home owner in bank 222 via Internet 220.

Bank 222 manages access to the associated bank account via a server 224 which runs an identity verification and customer authentication application 226 and an account transactions application 228. In some embodiments, when the customer using device 202 logs into their associated bank account, identity verification and authentication application 226 compares the detected WiFi networks 204 to a stored list of WiFi networks linked to the associated bank account. In some embodiments, based on the match between the stored set of WiFi networks and the detected WiFi networks 204, identity verification and authentication application 226 may communicate to account transactions application 228 a result or score, which account transactions application 228 may use to permit transactions, limit or restrict transactions, or deny transactions involving the associated bank account.

Figure 3:
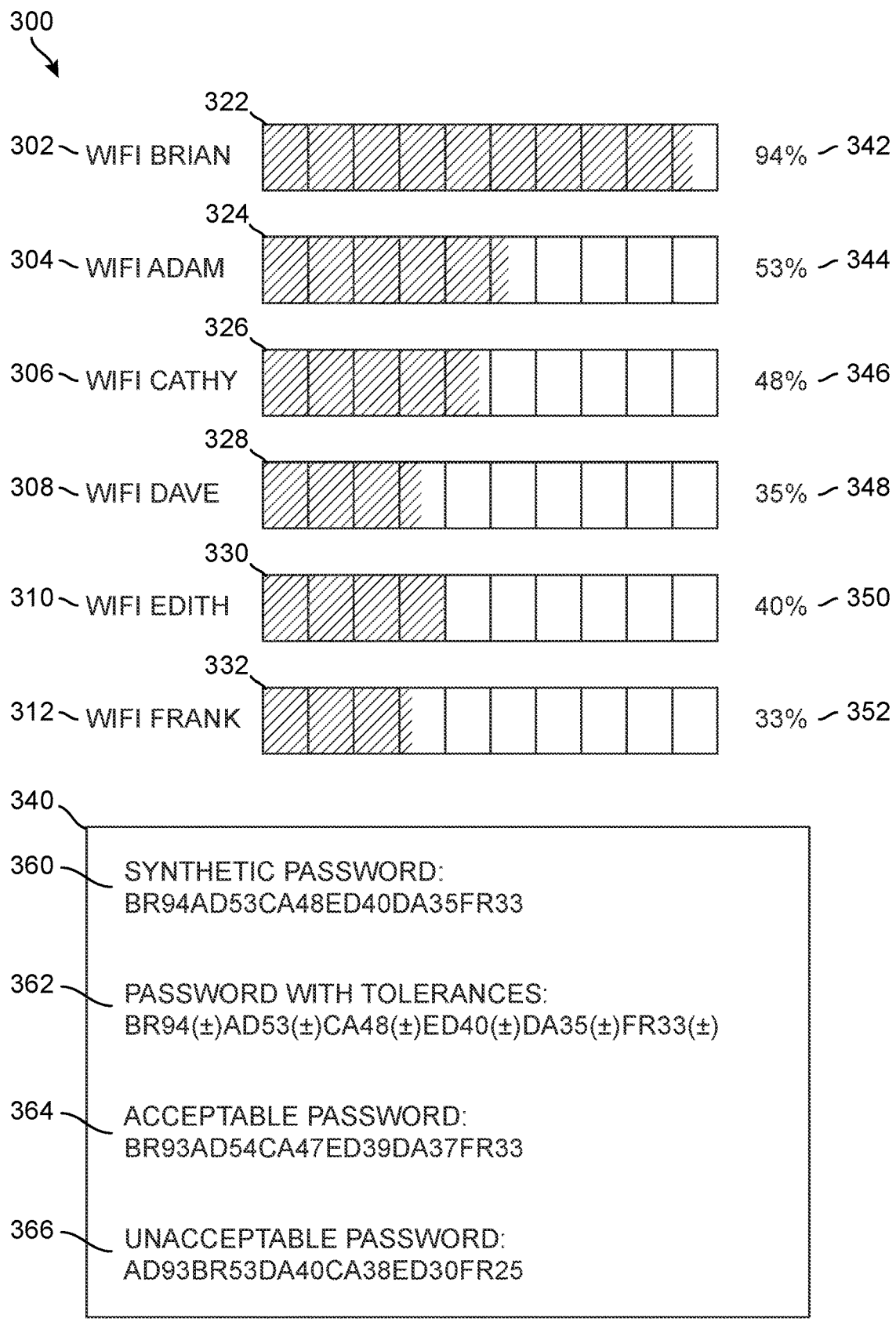
FIG. 3 is a schematic diagram illustrating an embodiment that uses synthetic passwords to provide enhanced security.

FIG. 3 is a schematic diagram 300 that illustrates an example of an embodiment that uses synthetic passwords to further confirm the probable identity of the router being used to access a customer's accounts at a bank. In the case of the exemplary home environment shown in FIG. 1, the customer is using the WiFi network labeled "BRIAN" to access the customer's account at the bank. Because that network is the home network in this example, the customer's laptop computer registers the signal strength 322 of the "BRIAN" network 302 as very high, with a numerical value 342 of 94%. The two next door neighboring WiFi networks show moderate signal strengths: the signal strength 324 for the "ADAM" network 304 has a numerical value 344 of 53%, and the signal strength 326 for the "CATHY" network 306 has a numerical value of 48%. The next strongest signal comes from the neighbor across the street—the "EDITH" network 310 has a signal strength 330 with a numerical value of 40%. The other two neighbors are a bit farther away, so the signal strength 328 of the "DAVE" network 308 has a numerical value of only 35% and the signal strength 332 of the "FRANK" network 312 has a numerical value of only 33%.

In some embodiments, the relative signals strengths from the different networks may be used to create an instantaneous synthetic password that may be used to enhance security for the customer. The following descriptions are only examples of ways in which the relative signal strengths from different detected WiFi networks may be used to verify the source of the communication with the bank. In many cases, the use of the synthetic passwords may be at the customer's discretion.

As shown by item 360 in chart 340, a synthetic password may be created by concatenating parts of the network names with their signal strengths. For example, the first two letters in a given network name may be concatenated with the signal strength for that network and the first two letters of the neighboring networks to create the synthetic password "BR94AD53CA48ED40DA35FR33," as shown in entry 360 in chart 340. In some embodiments, this synthetic password may be stored at some previous time (for example when the customer first opened the account), and may be updated periodically or when the customer notices a change in his or her neighboring networks. In the latter cases, the customer may need to notify the bank in person or by some other self-authenticating means in order to avoid allowing fraudsters to intercept the authentication system.

In some embodiments, the synthetic password may allow some deviations in the signal strengths. For example, the signal strengths may have tolerances of +/−2%, as shown in entry 362 of chart 340. In that case, the password shown in entry 364 of chart 340— "BR93AD54CA47ED39DA37FR33" would be acceptable, while a password "AD93BR53DA40CA35ED30FR25" would be unacceptable. Note that in these examples, the concatenation is carried out in order of signal strength, but other orders such as in the order of the initially stored synthetic password, in alphabetical order or in any other order may be used as well. In some embodiments, the server may periodically request the synthetic password on its own accord, and store the most recent password or passwords for later use.

Figure 4:
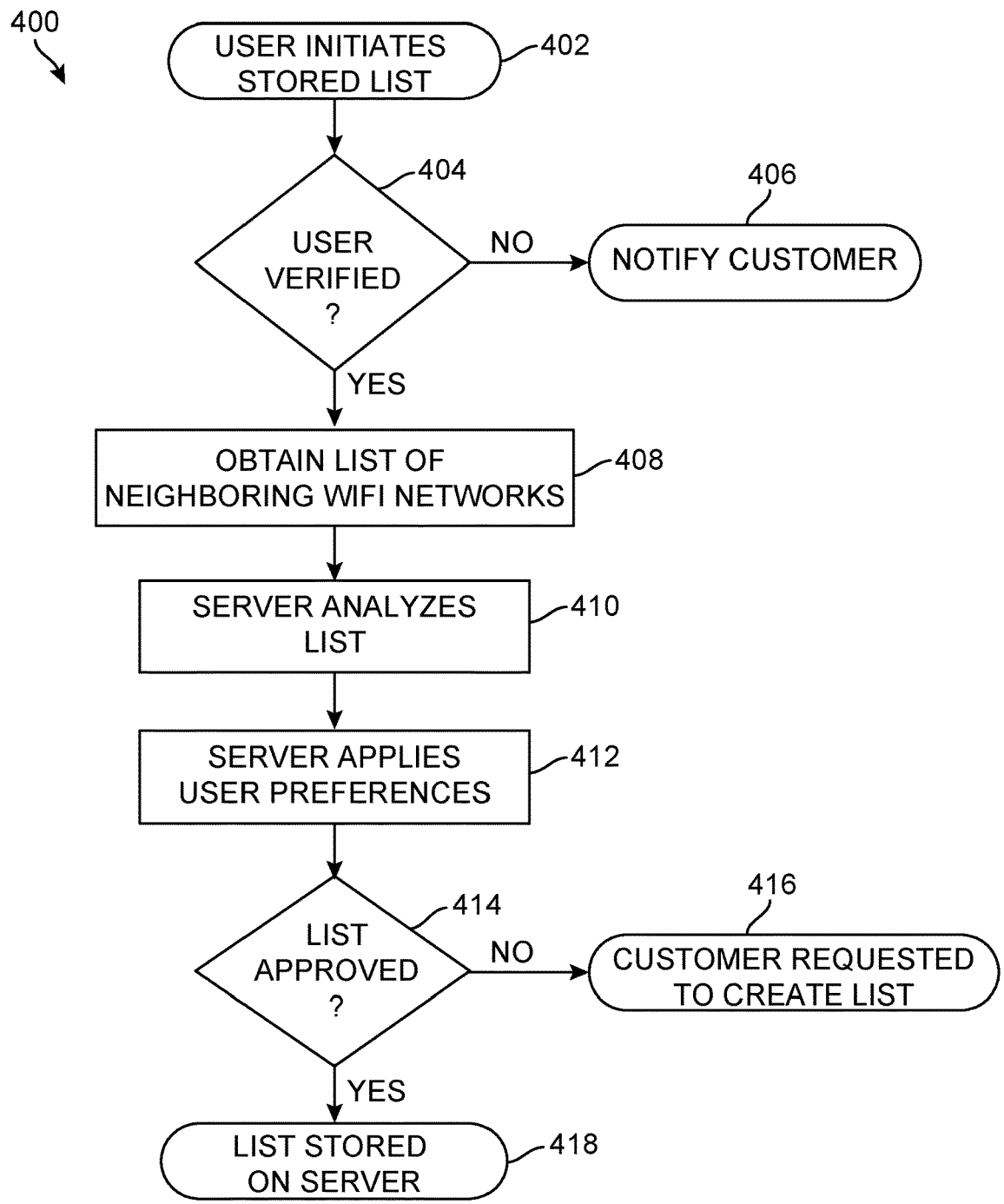
FIG. 4 is an exemplary flowchart illustrating how a server may obtain a stored list of nearby WiFi signals, in an embodiment.

FIG. 4 is a flowchart 400 illustrating an exemplary method by which a server may store a list of nearby WiFi signals to associate with a specific customer's account, which it can subsequently use to authenticate future activity for that account. In some embodiments, the server may also store a synthetic password for the account. In some embodiments, the server may also store tolerances for the signal strengths as described above with reference to FIG. 3. In step 402, this method is initiated when the bank's server detects a user's request to initiate a procedure for generating a stored list of neighboring WiFi LANs. In some embodiments, the user initiates this process by logging into an account associated with the customer and making a request to generate a list to the server. In step 404, the server attempts to verify that the request came from a customer who is authorized to access the account, i.e., that the user is indeed the customer for the account. In some embodiments, such verification includes the server texting a one-time password to a separate device associated with the customer (such as a smart phone) linked to the account. In some embodiments, such verification includes having the user answer biographical or other personal questions to verify his or her identity. If such verification fails, then at step 406, the serves sends a notice to the authorized customer associated with the account and the method ends. In some embodiments, this notice might include sending an email to an email address associated with an authorized customer informing the customer that a request was received to store a list of nearby WiFi signals to associate with the account, but customer verification failed.

If such verification succeeds, then at step 408, the server makes a call to a driver controlling the WiFi adapter of the customer's current device. The driver returns the complete list of detected WiFi networks to the bank's server, organized by associated signal strengths, for example, or by their SSIDs. At step 410, the server analyzes the list of detected WiFi networks to determine which ones meet the criteria for inclusion on the stored list to be associated with the account. In some embodiments, such criteria include ensuring that a detected WiFi network's signal strength is above a certain threshold. In some embodiments, such criteria include ensuring that a detected WiFi network emanates from a router and not from a personal device, for example, such as from a mobile hotspot. In some embodiments, the server assigns the WiFi network to which the device is currently connected "home" network status. At step 412, the server may apply additional criteria that have been selected by the customer. For example, the customer may eliminate a neighbor's WiFi network from the list because he or she believes that its signal strength is inconsistent and/or unreliable, or because it may be generated by a router that is not always active.

At step 414, the server asks the customer to grant approval to associate the list of WiFi networks that meet all the applied criteria with the account. At step 416, if the customer denies approval, the server displays the unanalyzed complete list of detected WiFi networks and asks the customer to create the list by manually selecting which of the detected WiFi networks to associate with the account. After this manual selection, the server associates the selected list with the account. In some embodiments, association of the selected list with the account includes storing it in a database communicating with a customer verification application running on a bank server. In some cases, such manual selection would be necessary in the unusual event that the signal strength of the customer's home network does not meet the threshold applied by the server for inclusion on the stored list associated with the account. At step 418, if the customer grants approval, then the server associates the list of WiFi networks that meet all the applied criteria with the account. In some embodiments, association of the selected list with the account includes storing it in a database communicating with a customer verification and authentication application running on a bank server.

Figure 5:
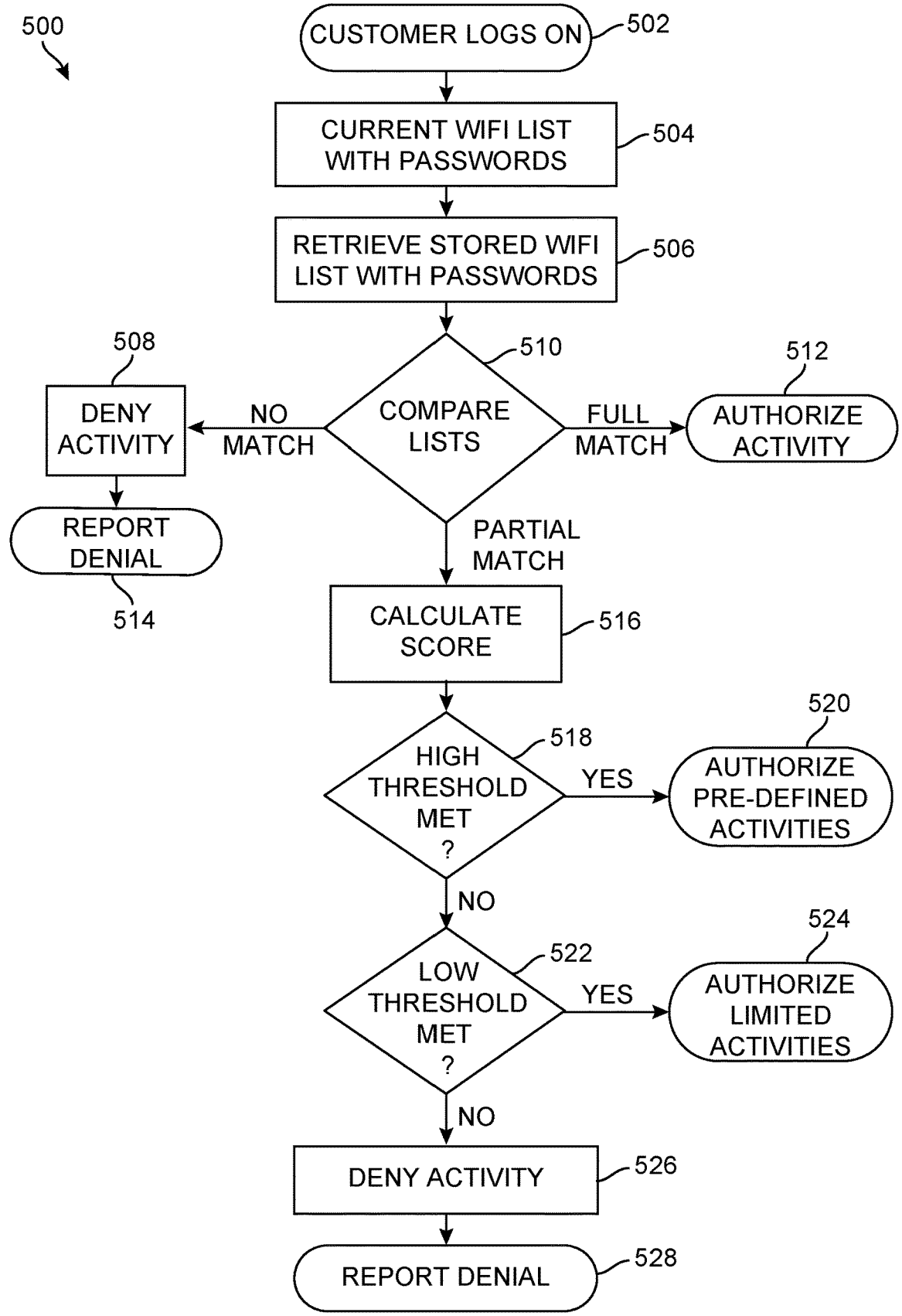
FIG. 5 is an exemplary flowchart illustrating a method for authorizing activities on an account associated with a particular customer, in an embodiment.

FIG. 5 is a flowchart 500 illustrating a method that a server may use to authorize activities on an account associated with a particular customer, if appropriate. In this embodiment, the method begins at step 502 when the server determines that a customer is logging into an account which is associated with an approved list of nearby WiFi networks. At step 504, the server queries the WiFi adapter for the customer's computing device for the list of currently detected WiFi networks and receives the current synthetic password. In some embodiments, the server asks the customer's permission on a separate device before performing this query. In some embodiments, if the customer does not grant this permission, the server restricts the access to the account.

At step 506, the server retrieves the stored list of WiFi networks and the stored synthetic password associated with the account. In some embodiments, such a list is stored on a database communicating with a customer verification application running on a bank server. At step 510, the server performs a comparison between the stored list and the list of currently detected WiFi networks, and in some embodiments also compares the currently received synthetic password to the stored synthetic password. In some embodiments, comparing these lists also includes comparison of the SSIDs and security protection standards for each of the currently detected WiFi networks. In some embodiments, comparing these lists includes comparing the network characteristics of the WiFi network to which the customer is currently connected to the stored WiFi network that has been assigned "home" status. In some embodiments, the comparison omits any detected mobile hotspots or WiFi networks whose signal strength does not meet a certain threshold.

In some embodiments, the server on its own (i.e., not in response to a customer logging in to his or her account) periodically queries the customer's router for the synthetic password, and stores the results. In those embodiments, in step 510, the server performs a comparison between the stored list and the list of currently detected WiFi networks, and also compares the currently received synthetic password to the most recently stored synthetic password. In other embodiments, it makes a comparison of the currently received synthetic password to the range of recently stored synthetic passwords. If there is a good match to any of the recently stored synthetic passwords, then the current synthetic password may be classified as acceptable.

If the comparison determines that the lists are identical and the passwords match, then at step 512, the server allows the customer full access to the account and the ability to perform all transactions on the account. If the comparison determines that there are no common elements (or if less than half or a third, for example, are in common) between the lists or if the synthetic passwords do not match, then at step 508, the server denies the customer access to the account and, at step 514, notifies an authorized customer associated with the account of the denial. In some embodiments, the denial may be logged in a database of potentially suspicious network activity for possible further investigation.

If the comparison determines that the lists are not identical but there are an adequate number of common elements and the received synthetic password is acceptable, then at step 516, a verification score is calculated based on the extent of the match between the lists. In the embodiments described above with respect to FIG. 3, the score may also include a comparison of the currently received synthetic password to a previously stored synthetic password. In some embodiments, the customer is warned that the list of currently detected WiFi networks has only achieved a partial match and is given an opportunity to move their device to a new location where a better match could be achieved. In some embodiments, in calculating this verification score, more weight may be assigned to a comparison between the specific characteristics of the WiFi network to which the customer is currently connected (such as its SSID) and the stored characteristics for that network. In some embodiments, comparing these lists to calculate a verification score includes comparison of the SSIDs, signal strengths and security protection standards for each of the currently detected WiFi networks, as well as in some embodiments a comparison of the synthetic passwords (within their tolerances).

At step 518, the verification score is compared to a "high" threshold. If the verification score meets or exceeds the "high" threshold, then at step 520, the server allows the customer to engage in a pre-defined set of activities on the account, which ends the method of FIG. 5. For example, the verification score may be increased if the current synthetic password matches the stored synthetic password, either exactly (best) or within the allowed tolerances (good). In some embodiments, an authorized customer associated with the account pre-defines which activities are allowed if the verification score meets or exceeds the "high" threshold (for example based upon his or her historical knowledge of the signal strength detected for these networks). An example of pre-defined activities could be payments to the customer's typical payees, associated with limits for each payee. A more specific example could be a customer who expects his cable bill to be about $200, and authorizes payments to the cable company only up to $250. If the verification score does not meet or exceed the "high" threshold, then at step 522, the verification score is compared to a "low" threshold. Again, the verification score may also include a comparison of the current synthetic password with a previously stored synthetic password. For example, if the signal strengths included in the synthetic password are, for example, all off but within the tolerance and the signal strengths are nevertheless listed in the correct order, that might be sufficient for a verification score that meets the "low" threshold but not the "high" threshold. If the verification score meets or exceeds the low threshold, then at step 524, the server allows the customer to engage in a limited set of activities on the account, which ends the method of FIG. 5.

In some embodiments, an authorized customer associated with the account may define which activities are allowed if the verification score meets or exceeds the "low" threshold but not the "high" threshold. Typically, these activities may simply be limited by a dollar amount, such as $50 or $100, or the customer may devise another way for limiting the risk, such as by limiting payments using debit cards by categories, for example no more that $25 at restaurants or some other value or no more than $75 at retail stores or some other value, for example. If the verification score does not meet or exceed the "low" threshold, then at step 526, the customer is denied access to the account. At step 528, an authorized customer associated with the account is notified of this denial, which ends the method of FIG. 5.

Figure 6:
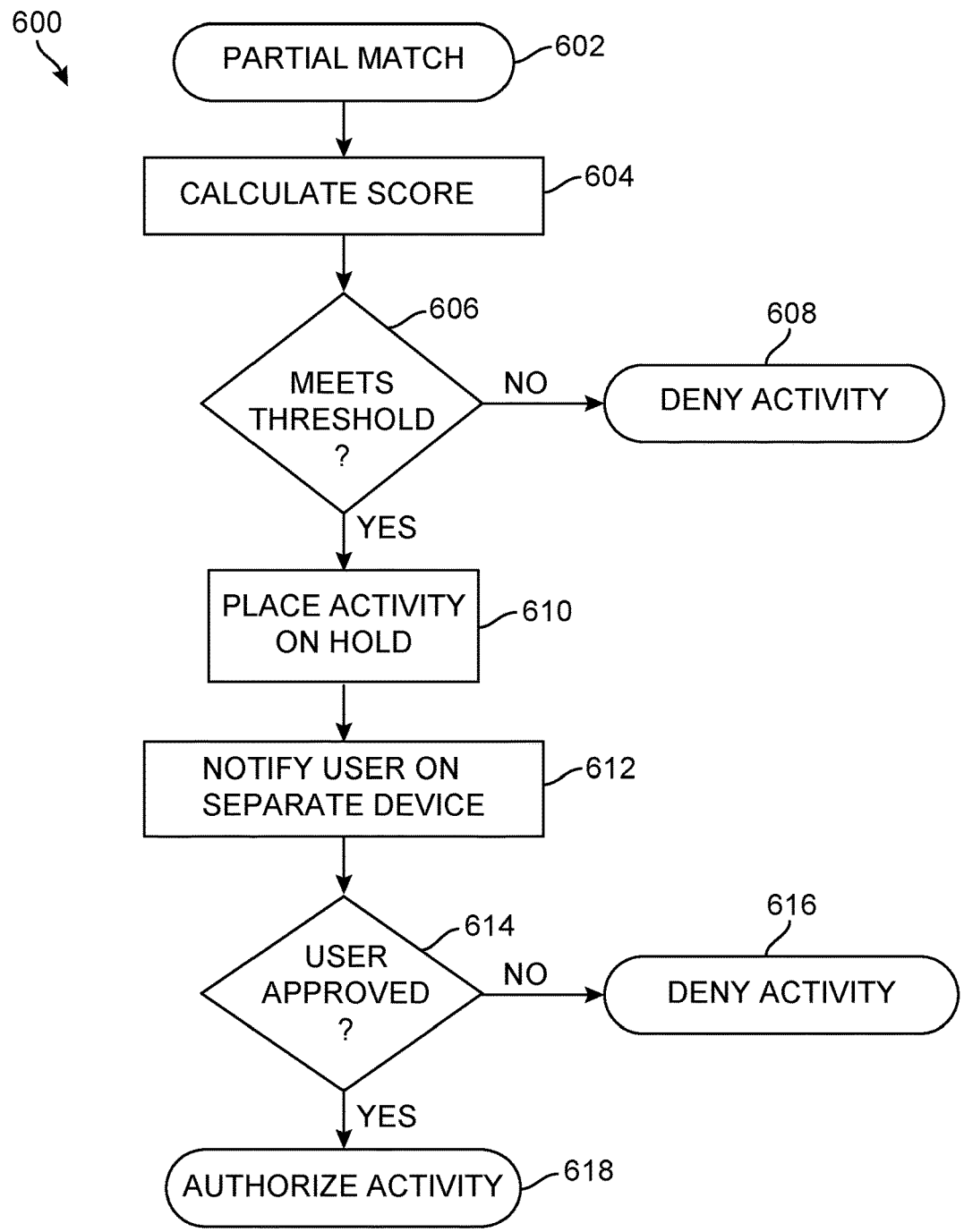
FIG. 6 is an exemplary flowchart illustrating an alternative method for authorizing activities on an account associated with a particular customer, in another embodiment.

FIG. 6 is a flowchart 600 illustrating an alternative to the method of FIG. 5. In this method a server uses detected nearby WiFi signals to potentially place holds on activities on an account associated with a particular customer, instead of directly approving transactions when the server determines that there is only a partial match. In this embodiment, step 602 in flowchart 600 incorporates steps 502-514 of FIG. 5.

At step 602, this alternative method begins after the process determines that a partial match has been found between the stored list of WiFi networks and the currently detected list of WiFi networks, and in some embodiments that the current synthetic password is anywhere between an exact match and a fair match within the tolerances to the stored version of the synthetic password. At step 604, a verification score is determined based on the extent of the match between the lists and the synthetic passwords. In some embodiments, comparing these lists to calculate a verification score may include comparison of the SSIDs and security protection standards for each of the currently detected WiFi networks. It may also include a comparison of the signal strengths of neighboring WiFi networks, either as described above with reference to FIG. 3 by using a synthetic password, or by using some other methodology.

At step 606, this verification score is compared to a threshold value. If the verification score does not meet or exceed the threshold, then the customer is denied access to the account at step 608. If the verification score does meet or exceed the threshold, then at step 610, the customer may be allowed some pre-defined level of access to the account and any transactions the customer undertakes are logged but placed on hold. At step 612, an authorized customer associated with the account is notified of and asked to approve the transactions that have been placed on hold using contact information associated with the authorized customer. This request for approval may be transmitted to a separate device (such as a smart phone) associated with the customer, instead of being sent to the computing device that initiated the request for an activity on the account associated with the particular customer. If the authorized customer does not approve the transactions that have been placed on hold, then at step 616 the transactions that have been placed on hold are denied. If the authorized customer approves the transactions that have been placed on hold, then at step 618 the server removes the hold, and the transactions are allowed to proceed. In some embodiments, if the authorized customer does not respond to the notification after a pre-determined amount of time, then the transactions that have been placed on hold are allowed. In other embodiments, if the authorized customer does not respond to the notification after the pre-determined amount of time, then the transactions that have been placed on hold are denied.

In some embodiments, transactions may be allowed after the pre-determined time if the customer does not respond but the current synthetic password matches the stored synthetic password. In other embodiments, transactions may be denied after the predetermined amount of time if the current synthetic password is not a strong match to the stored synthetic password—for example if the password was acceptable because each of the signal strengths was within the tolerances, but many (possibly excluding the signal strength of the home network) were not an exact match.

Figure 7:
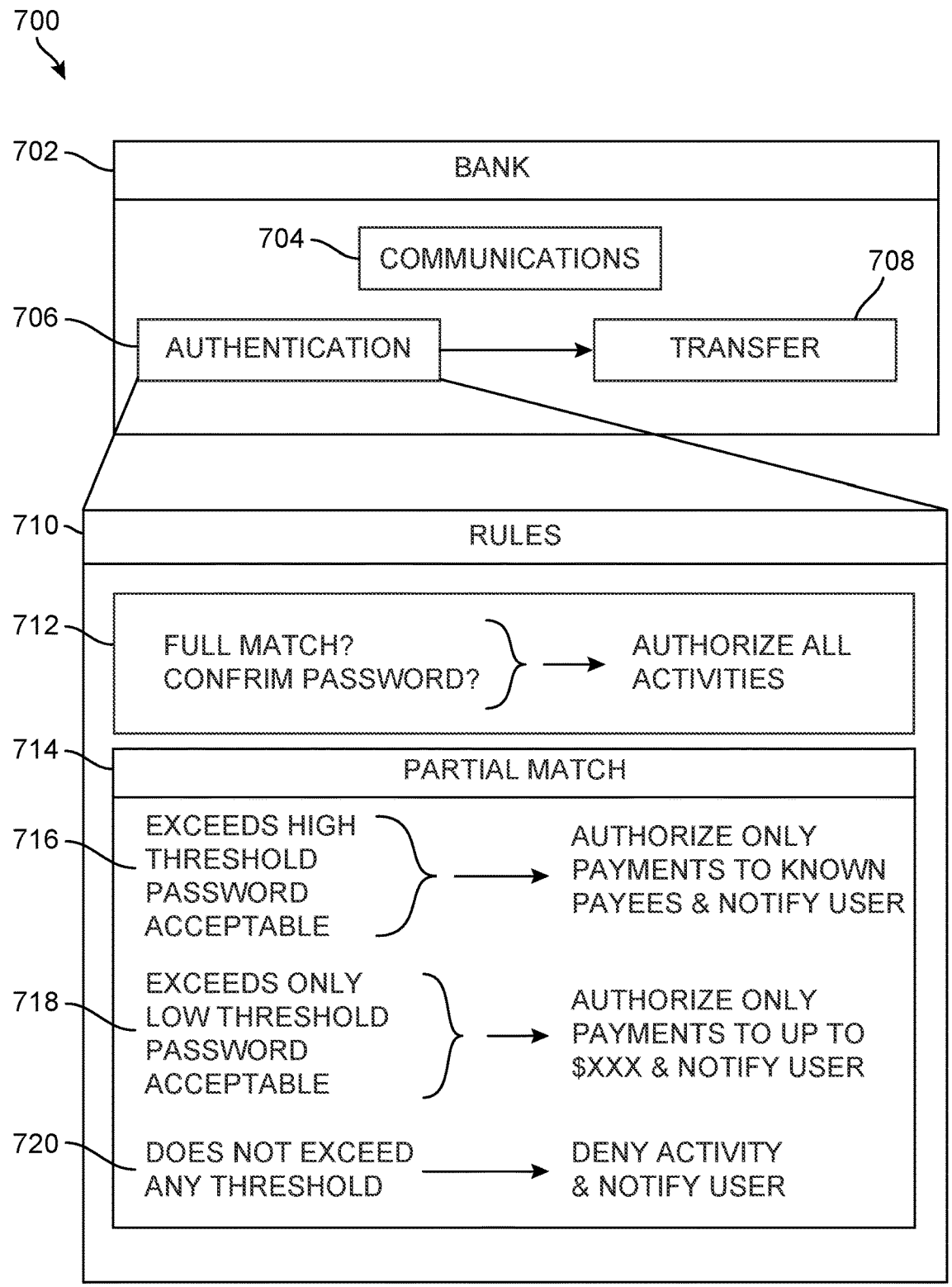
FIG. 7 is a schematic diagram illustrating rules that an authentication app may use authorize to activities on an account, in an embodiment.

FIG. 7 is a schematic diagram 700 illustrating rules that a server may apply to authorize potential activities on an account based on WiFi signals detected by a computing device a customer is using to access the account and instructions as to how those rules are to be implemented. A bank 702 communicates with remote customers of accounts via a communications device 704, such as an enterprise router. Communications device 704 allows authorized customers to make financial transactions with bank 702. To authorize customers to make these financial transactions, bank 702 uses an authentication app 706. Authentication app 706 implements a set of rules 710 with which to authorize activity on some set of accounts associated with bank 702.

Rules 710 define the extent to which a remote customer is allowed to access an account with banking enterprise 702 based on how the set of WiFi networks the remote customer's device detects compares to a stored list of WiFi networks associated with an account that the remote customer attempts to access. Rule 712 applies if the detected set of WiFi networks is a full match to the stored list of WiFi networks and the received synthetic password is confirmed. In some embodiments, rule 712 may only require the current synthetic password to match the stored synthetic password within the tolerances set by the customer. In these cases, the customer is permitted to undertake any transaction on the account.

If the detected set of WiFi networks is only a partial match to the stored list of WiFi networks associated with the account and/or the current synthetic password is not a strong match to the stored synthetic password, then one of the rules in set 714 applies. A set of criteria are applied to calculate, for example, a number, a percentage or other numerical measure that represents the extent of the match between the detected set of WiFi networks and the stored list of WiFi networks associated with the account. This numerical measure may include the extent of the match between the current synthetic password and the stored synthetic password. If the numerical measure of the match exceeds a pre-determined "high" threshold, then rule 716 applies, in which case the customer is authorized to make payments from the account only to known payees associated with the account and an authorized customer associated with the account is notified of any requested transactions. If the numerical measure of the match exceeds only a "low" threshold, then rule 718 applies, in which case the customer is authorized to make payments from the account only up to a pre-determined amount and an authorized customer associated with the account is notified of any requested transactions. If the number or percentage or (or other numerical measure) of the match does not exceed the "low" threshold then rule 720 applies and the customer is denied access to the account and an authorized customer associated with the account is notified of this denial.

Once authentication app 706 has, to some degree, authorized a remote customer access to an account with bank 702, it communicates the degree to which the customer can access the account and the limits on any transfer of funds to transfer app 708. Transaction app 708 then facilitates transactions requested by the remote customer on an account with bank 702. In some embodiments, communications device 704, authentication app 706 and transfer app 708 are implemented by one or more network servers connected to the Internet.

Figure 8:
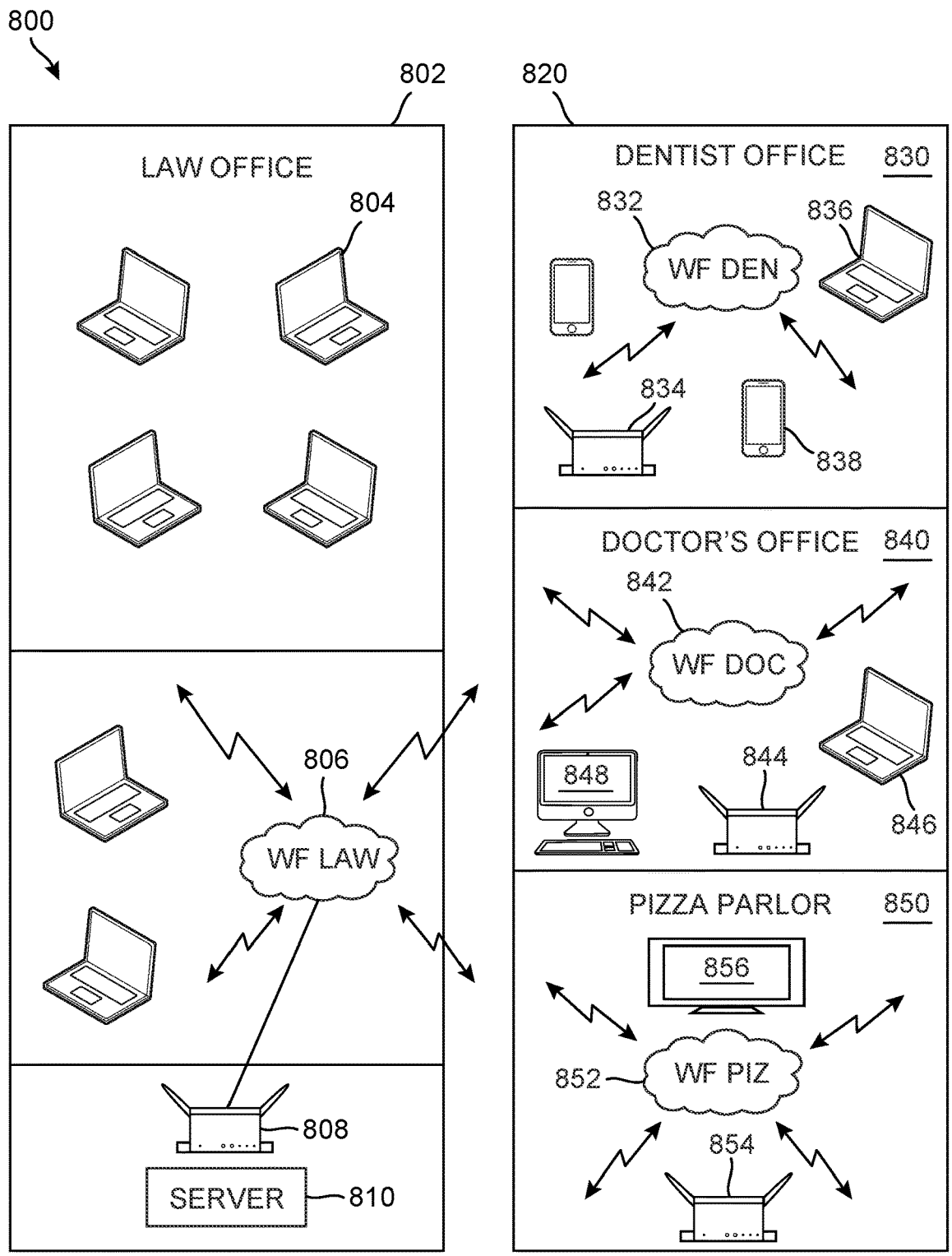
FIG. 8 is an illustration of the context for authenticating a customer working in an office environment, in an embodiment.

FIG. 8 is an illustration 800 of another embodiment in which a system and method of authenticating a customer's identity by identifying nearby WiFi signals is used. In this context, the customer works in an office with multiple users of computing devices, all of which share the same router. For example, law office 802 is an enterprise having multiple users, several of whom may have accounts at the same bank. For convenience, these several customers shall be referred to as "common customers." Since each of these common customers access their bank accounts using the same router, namely router 808 shown in FIG. 8, for example, the systems and methods described above with reference to the context illustrated in FIG. 1 would generally not identify any one specific common customer from any other common customer. For that reason, additional authentication measures may need to be used when multiple customers communicate with the same bank, as described below with reference to FIG. 9, FIG. 10A, FIG. 10B and FIG. 11.

As shown in FIG. 8, router 808 broadcasts signals and receives signals via wireless local area network WF LAW 806 which computing devices 804 in law office 802 use to connect to the Internet. Server 810 manages access to web resources associated with law office 802. Building 820 is in proximity to law office 802. It includes a dentist office 830, a doctor's office 840, and a pizza parlor 850. Dentist office 830 includes a router 834 broadcasting over its associated WiFi network WF DEN 832; doctor's office 840 includes a router 844 broadcasting over its associated WiFi network 842; and pizza parlor 850 includes a router 854 broadcasting over its associated WiFi network WF PIZ 852. Dentist office 830 includes a laptop computer 836 and smartphones 838; doctor's office 840 includes a laptop computer 846 and a desktop computer 848; and pizza parlor 850 includes a desktop computer 856.

Owing to the proximity of router 834, router 844, and router 854, laptop computers 804 all detect their associated WiFi signals even though they can only actually connect to the wireless local area network 806. Detection of these WiFi signals only links laptop computers 804 to a geographic location, but does not identify any specific customer among the different persons using the laptop computers. Thus, the geographic location by itself may not distinguish the specific customer using a specific laptop computer 804 from the other common customers in law office 802. For that reason, additional precautionary measures may need to be taken to authenticate each specific customer. In this embodiment, when a specific customer logs on to his or her account at a bank or other financial institution, that bank or financial institution may take additional precautionary steps such as requiring extra steps (such as those described below with reference to FIG. 10A) to identify a specific customer when that customer is logging in from his or her office (compared to when the specific customer is logging in from home).

Figure 9:
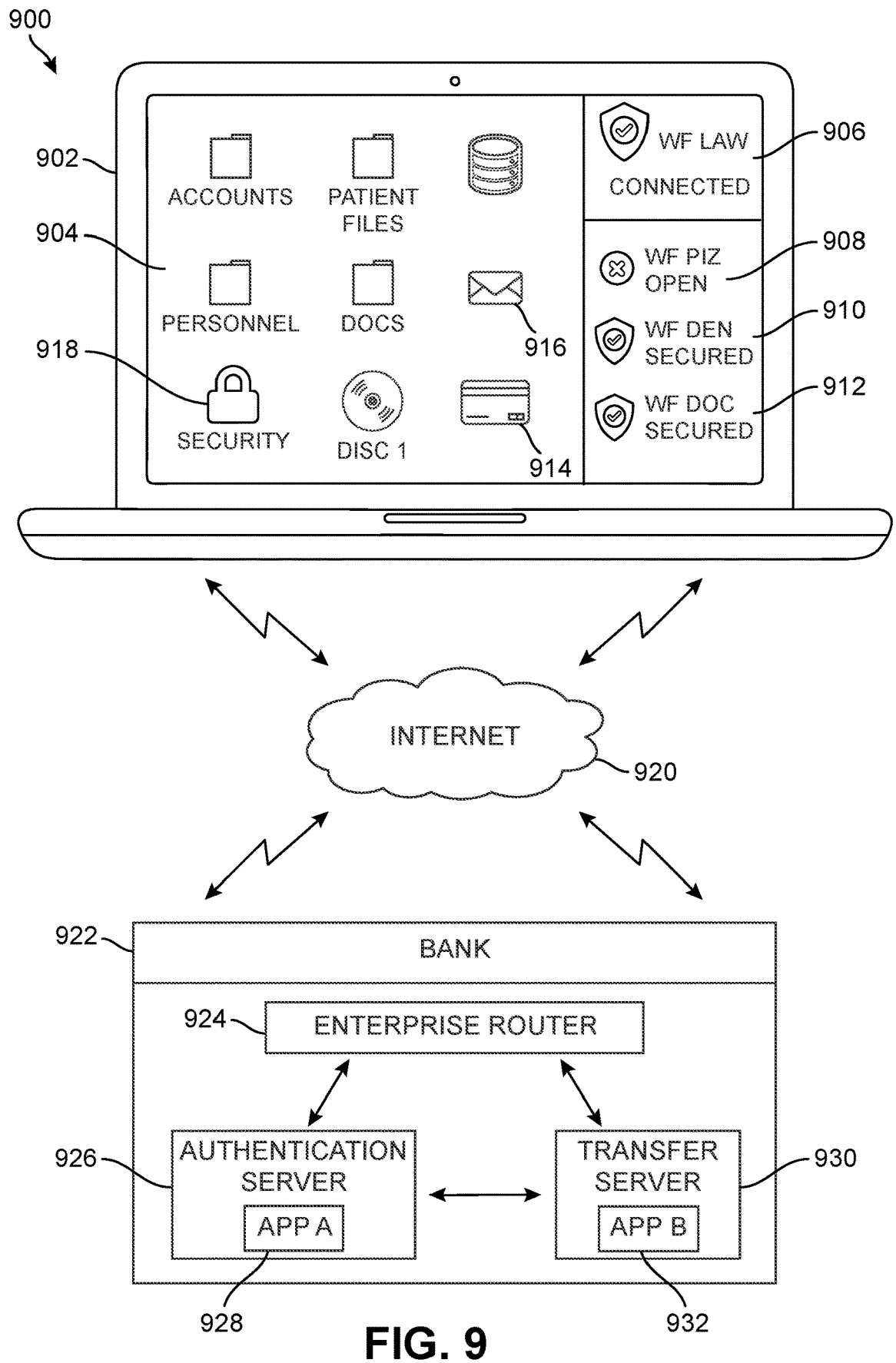
FIG. 9 is a schematic diagram showing the communications between a bank and a customer in an office environment, in an embodiment.

FIG. 9 is a schematic diagram 900 showing the communications between a computing device 902 and a bank 922. Bank 922 uses the WiFi signals that a specific customer's computing device 902 detects as an initial step in authenticating the specific customer's identity when the specific customer is associated with an enterprise that has multiple common customers. Computing device 902 includes a display 904 which the specific customer uses to accesses a set of applications, such as, for example, a device security application 918; an email client 916; and a banking application 914. Display 904 also allows the customer to access a WiFi adapter utility which displays a set of detected WiFi networks, including WiFi network 906; WiFi network 908; WiFi network 910; and WiFi network 912. In this embodiment, WiFi network 906, to which device 902 is connected, has been secured by a security protocol, for example, the WPA2 protocol. In this embodiment, the detected WiFi networks come from nearby WiFi routers. In some embodiments, a banking application 914 on computing device 902 allows the customer using device 902 (and other customers within the same enterprise, as shown in the law office illustrated in FIG. 8) to access an enterprise router 924 in bank 922 over the Internet 920. In other embodiments, item 914 is just an icon for a link to a banking app that the customer may use to communicate with his or her bank over the Internet. In yet other embodiments, the customer may prefer not to have an icon on his desktop, and may instead communicate with his or her bank by entering the bank's URL into the address bar in a web browser on the laptop computer.

In this embodiment, when the specific customer using computing device 902 runs banking application 914 (or accesses the bank's website in another way), the specific customer enters a customer name which is transmitted to an authentication server 926 in bank 922 via enterprise router 924. Authentication server 926, running authentication application 928, retrieves a list of stored WiFi networks associated with the enterprise account associated with that customer name, and in some embodiments also receives a current synthetic password.

Authentication application 928 in authentication server 926 transmits a query via enterprise router 924 and Internet 920 to the customer's computing device 902 for its list of detected WiFi networks, and then receives the requested list. In some embodiments, authentication server 926 also receives a current synthetic password. Based on the extent of the matches between (1) the retrieved list of stored WiFi networks associated with the enterprise account and the list of detected WiFi networks returned from computing device 902 and (2) in those embodiments that also use a synthetic password, the current synthetic password and the stored synthetic password, authentication application 928 calculates an authentication score. It then transmits the allowed transactions via enterprise router 924 to a transactions application 932 running on a transfer server 930. Transactions application 932 then executes the allowed transactions.

Figure 10A:
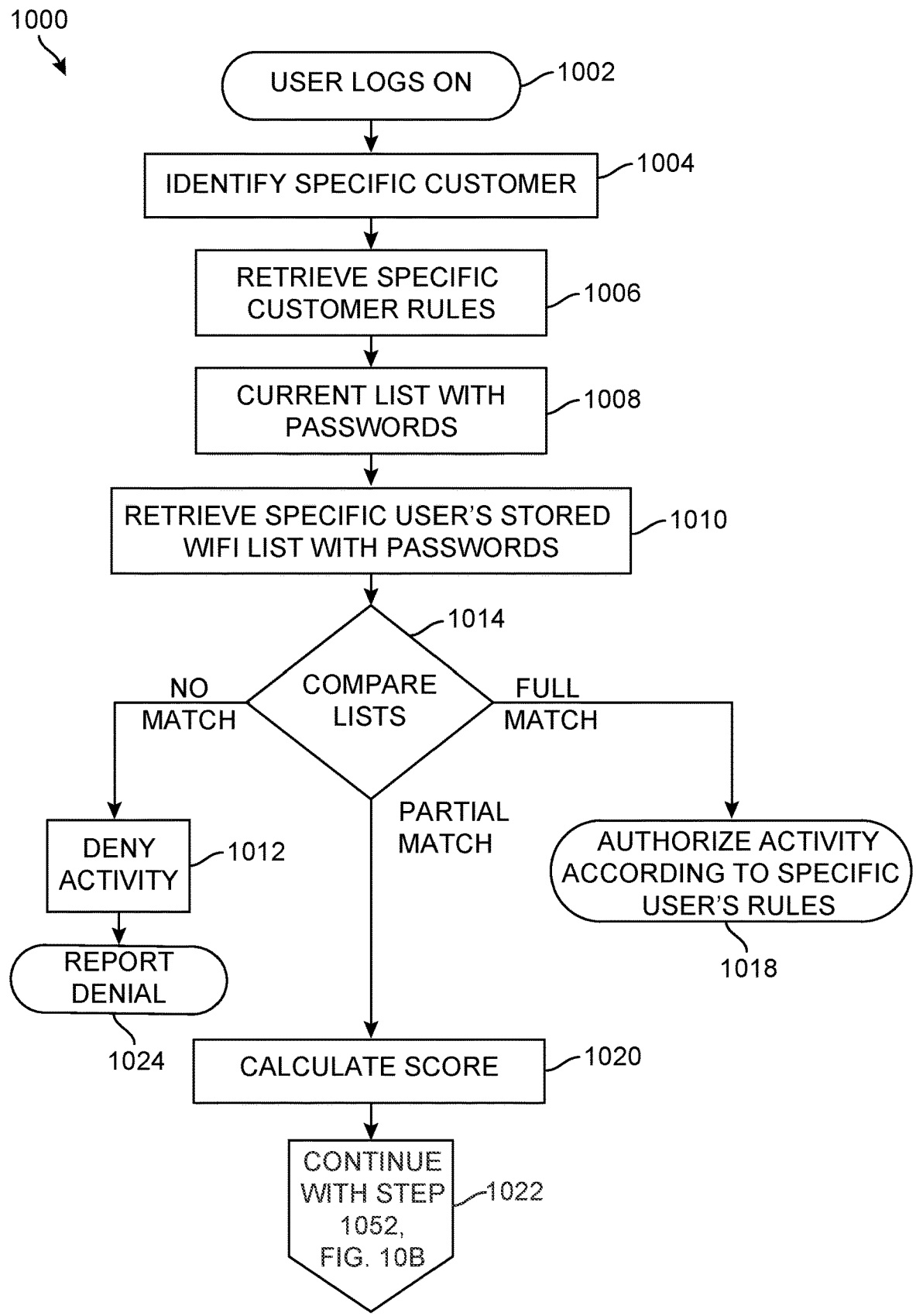
FIG. 10A and FIG. 10B illustrate an exemplary flowchart that a financial institution may use to authorize activities, in an embodiment.
Figure 10B:
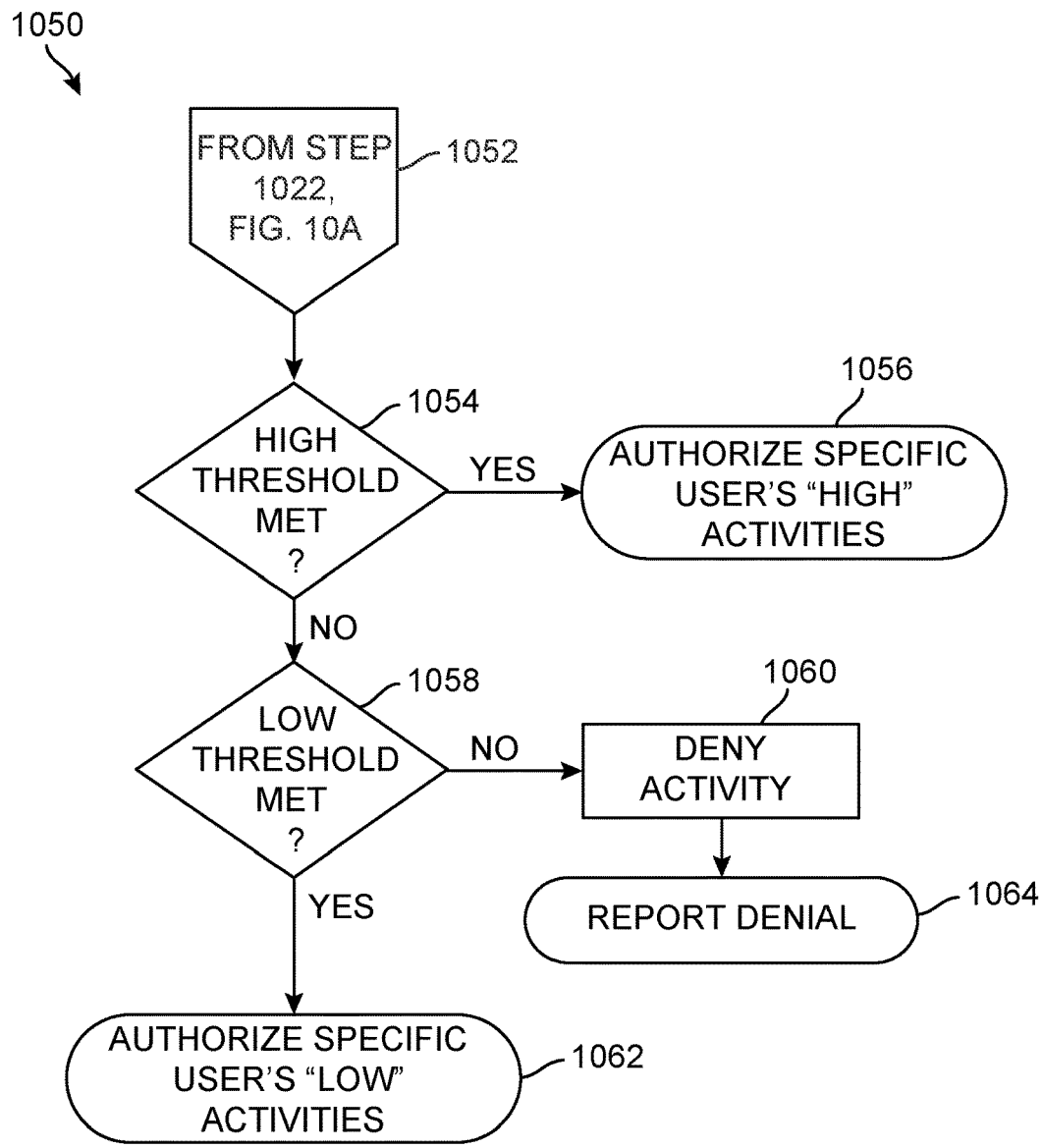

FIG. 10A and FIG. 10B together illustrate an exemplary flowchart illustrating a method that a server may implement using detected nearby WiFi signals to authorize activities on an account. This method begins with step 1002 in the first portion 1000 of the flowchart, as a customer attempts to log into a bank server. Because there could be multiple customers that would have the same set of nearby WiFi signals, the process requires additional methods for identifying the specific customer who may be allowed access to the specific customer's account. Thus in step 1004, the server identifies the user as a specific customer based on the submitted customer name and password, but may also require additional means for authenticating the customer, such as requiring two-factor identification, or confirmation of personal knowledge such as the name of a favorite teacher, an aunt or a family pet, for example.

In step 1006, the authentication app retrieves a set of rules that define those transactions that the specific customer may conduct from the somewhat less secure office environment. For example, the rules may define those fund transfers the specific customer may conduct from the account with a full match; those transactions the specific customer may conduct with a score meeting a "high" threshold; and those transactions the specific customer may undertake with a score only meeting only a "low" threshold.

In step 1008, the server queries the customer's device for the list of currently detected nearby WiFi signals and for the current synthetic password. In step 1010, the server retrieves the stored list of nearby WiFi signals associated with the customer name and the stored synthetic password. At step 1014, the server performs a comparison between the stored list and the list of currently detected WiFi networks, as well as a comparison of the current synthetic password to the stored synthetic password. In some embodiments, comparing these lists includes comparison of the SS IDs, and security protection standards for each of the currently detected WiFi networks. In some embodiments, comparing these lists includes comparing the network characteristics of the WiFi network to which the customer is currently connected to the stored WiFi network that has been assigned "office" status. In some embodiments, the comparison omits any detected mobile hotspots or WiFi networks whose signal strength do not meet a certain threshold.

If the comparison determines that the lists and the synthetic passwords are identical, then at step 1018, the server allows the customer access to the account within the limits set for that customer name for a full match of the WiFi networks and the synthetic passwords. If the comparison determines that there are no common elements between the lists or that the synthetic passwords do not match within the tolerances set by the customer, then at step 1012, the server denies the customer's request and, at step 1024, notifies an authorized customer of the account of the denial. In some embodiments, the denial may be logged in a database of suspicious network activity for further investigation.

If the lists are not identical but there are common elements between the two lists and the current synthetic password matches the stored synthetic password within the tolerances set by the customer, then at step 1020, a score is calculated based on the extent of the match between the lists and the synthetic passwords for the login attempt. At step 1022, the flowchart continues onto the second portion 1050 of the flowchart with step 1052 in FIG. 10B. At step 1054, the score is compared to a "high" threshold. If the score meets the "high" threshold, then at step 1056, the server authorizes this specific customer to undertake all transactions allowed for this customer name when their login attempt score meets a high threshold.

If the score does not meet the high threshold, then at step 1058, the score is compared to a "low" threshold. If the score does not meet the "low" threshold, then at step 1060, the server denies the request. In some embodiments, the process then ends at step 1060. In other embodiments, the denial is reported to the customer for the account and the process ends at step 1064. If the score meets or exceeds the low threshold, but not the high threshold, then the server authorizes this specific customer to undertake all transactions allowed for this specific customer when his or her login attempt only meets a low threshold at step 1062 and the process ends.

The flow chart illustrated in FIG. 10A and FIG. 10B is only exemplary, and several variations of the steps outlined in FIG. 10A and FIG. 10B may be used instead of those steps. For example, in some embodiments the server may conduct periodic tests of the synthetic password for the law office, and stored the results of these tests. The comparison of the synthetic passwords in step 1014 may then (1) require an exact match if the previously conducted periodic tests of the synthetic password of the office router have shown the synthetic password to be constant, or (2) find a match when the current synthetic password falls within the variations in the synthetic password that were detected during the periodic tests.

Figure 11:
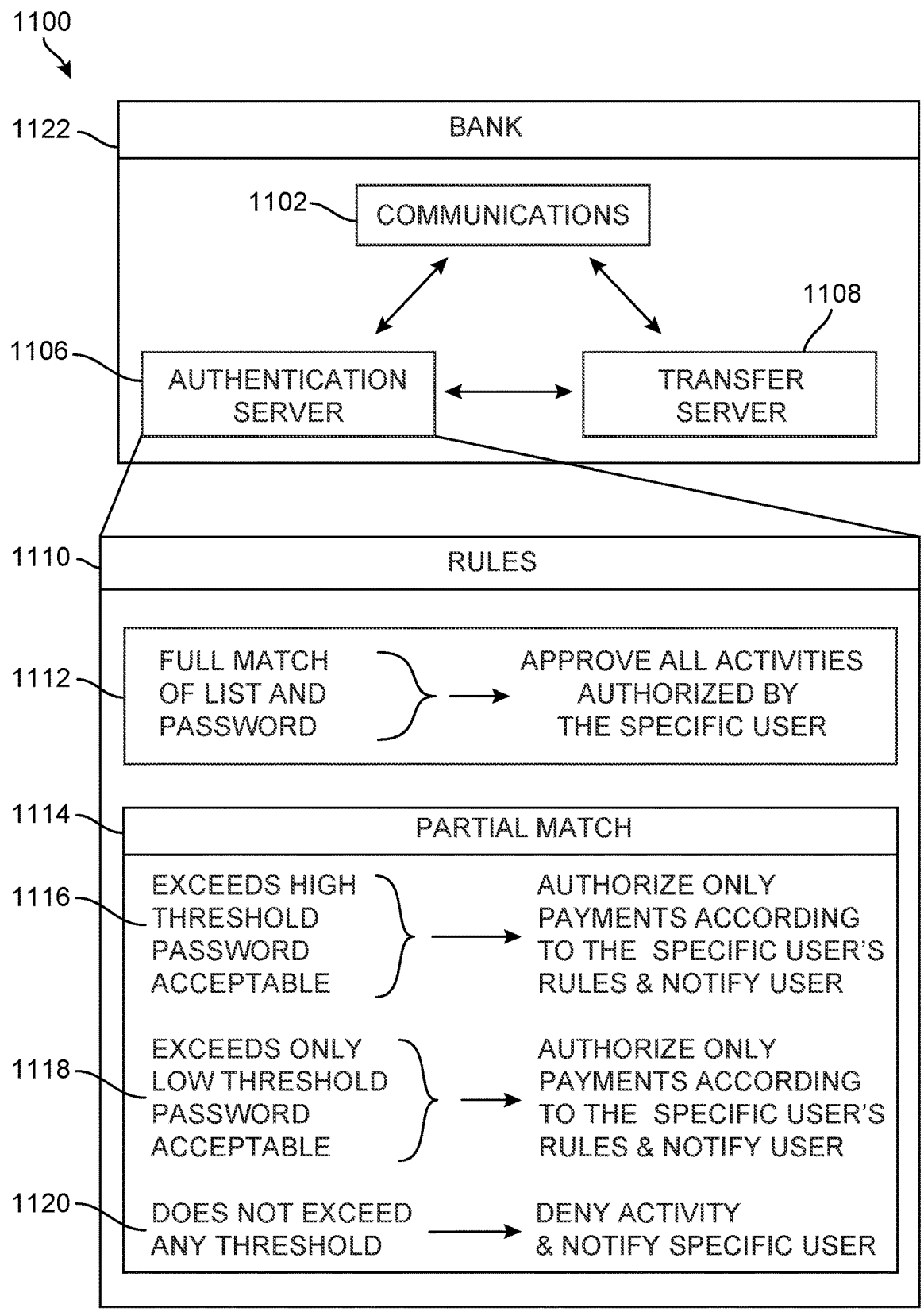
FIG. 11 is a schematic diagram illustrating rules that a bank may use to authorize transactions requested by a customer in an office environment, in an embodiment.

FIG. 11 is a schematic diagram 1100 illustrating rules that an authentication server 1106 in a bank 1122 may apply to authorize or deny transfers or other activities when the customer is working in an office environment. Bank 1122 is in communication with its remote account holders via a communications device 1102, which allows account holders access to their accounts at bank 1122. To authorize customers to make financial transactions, the bank uses an authentication server 1106. Transfer server 1108 may implement any transactions authorized by authentication server 1106. Authentication server 1106 implements a set of rules 1110 that it uses to authorize or deny activities requested by remote customers.

Rules 1110 outline the extent to which a remote customer working in an office environment is allowed to access his or her account with the bank based on (1) how the set of WiFi networks the remote customer's device detects compares to a stored list of WiFi networks associated with a customer name attached to the enterprise account that the remote customer attempts to access, and (2) a comparison of the current synthetic password to a stored synthetic password. Rule 1112 applies if the detected set of WiFi networks is identical to the stored list of WiFi networks and the current synthetic password matches the stored synthetic password. In that case, the customer is permitted to undertake any transaction on the account authorized for that customer in the office environment.

If the detected set of WiFi networks is not identical to the stored list of WiFi networks associated with the account, then one of the rules in the "partial match" set of rules 1114 applies. A set of criteria are applied to determine (1) the extent of the match between the current list of WiFi networks and the stored list of WiFi networks associated with the specific customer, and (2) whether the current synthetic password is acceptable. If the extent of the match exceeds a pre-determined "high" threshold and the synthetic password is acceptable, then rule 1116 applies. In that case the customer is authorized to conduct only a "high" subset of the transactions allowed on the account authorized for the specific customer of the account in the office environment, and the specific customer is notified of the requested transactions via a separate device (such as a smart phone, for example). If the numerical extent of the match exceeds only a "low" threshold and the synthetic password is acceptable, then rule 1118 applies. In that case, the specific customer is authorized to perform only a "low" subset of the transactions allowed authorized for the specific customer on the account when in the office environment, and the specific customer of the account is notified of the requested transactions via a separate device (such as a smart phone, for example). If the numerical extent of the match does not meet the "low" threshold then rule 1120 applies and the customer is denied access to the account and an authorized customer of the account is notified of this denial. Whenever authentication server 1106 has authorized specific transactions requested by the specific customer, it transmits the requests to transfer server 1108. Transfer server 1108 then executes the requested transactions and funds are transferred to the payees identified in the transfer requests. In some cases, the requested activities are not payments to payees, but instead might be a transfer of funds from the customer's savings account to the customer's checking account, for example. As another example, if the financial institution is an investment firm, the requested transaction may be, for example, instructions to buy or sell certain stocks or bonds.

Finally, the order of steps shown in the flowcharts are not necessary in a strict order. In many cases, one of ordinary skill in the art will recognize that certain steps may be executed in a different order than the order illustrated in the flowcharts, which are only exemplary.

While various embodiments have been described above, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A system for authenticating a customer of a bank attempting to access one of the customer's accounts at the bank comprising:
    a server at the bank to receive communications from a router located at premises associated with the customer, to call a driver controlling a network adaptor of a computing device connected to the router and associated with the customer to receive a complete list of wireless networks detected by the network adaptor, to generate a stored list of wireless networks from the complete list of wireless networks based on a signal strength associated with each wireless network, to generate a stored synthetic password using a concatenation of parts of a network name and a signal strength for each wireless network in the stored list of wireless networks, and to use the stored list of wireless networks to link the computing device to a geographical location;
    an identity verification and authentication application running on the server;
    a database in communication with the identity verification and authentication application, the database comprising the stored list of wireless networks and the stored synthetic password; and
    an account transaction application running on the server and in communication with the identity verification and authentication application;
    wherein when the server receives a request from the customer for the transfer of funds from one of the customer's accounts to a third party, the server performs two-factor authentication by first identifying the customer using a customer name and password submitted by the customer and second separately without input from the customer acquiring from the router a current list of wireless networks currently detected by the computing device and the server generates a current synthetic password using a concatenation of parts of a network name and a signal strength for each wireless network in the current list of wireless networks;
    wherein the identity verification and authentication application compares the current synthetic password to the stored synthetic password;
    wherein if the identify verification and authentication application determines that the current synthetic password fully matches the stored synthetic password, the server authenticates the customer and that the request for transfer of funds is from the computing device at the linked geographical location, and the identity verification and authentication application communicates a fully match score to the account transaction application that authorizes the customer's request for the transfer of funds.

2. The system of claim 1, wherein if the identity verification and authentication application determines that there is only a partial match between the current synthetic password and the stored synthetic password, the identity verification and authentication application calculates a partial match score.

3. The system of claim 2, wherein if the partial match score meets a pre-determined threshold, the identity verification and authentication application only authorizes certain pre-defined activities.

4. The system of claim 2, wherein if the partial match score only meets another threshold that is lower than the pre-determined threshold, the identity verification and authentication application only authorizes certain limited activities.

5. The system of claim 2, wherein the partial match score is calculated based in part on rules associated with the account.

6. A system for providing a customer with access to the customer's accounts at a bank comprising:
    a customer's computing device comprising a WiFi adaptor to detect wireless networks broadcast by routers in neighboring premises;
    a server at the bank in communication with a driver controlling the WiFi adaptor of the customer's computing device, the server used to receive a previously transmitted list of the wireless networks broadcast by routers in neighboring premises and network names and relative signal strengths of the wireless networks in the previously transmitted list of the wireless networks, to generate a stored synthetic password using a concatenation of parts of the network names and relative signal strengths for each wireless network in the previously transmitted list of the wireless networks, and to store the stored synthetic password; and
    a database in communication with the server and comprising the previously transmitted list of wireless networks and the stored synthetic password;
    wherein whenever the customer accesses the customer's accounts at the bank to submit a request fora transfer of funds, the server performs two-factor authentication by first identifying the customer using a customer name and password submitted by the customer and second separately without input from the customer making a call to the driver to obtain a current list of the wireless networks broadcast by routers in neighboring premises, the network names, and the relative signal strengths of the wireless networks in the current list of wireless networks and the server generates generating a current synthetic password using a concatenation of parts of the network names and relative signal strengths for each wireless network in the current list of the wireless networks; and
    wherein whenever the current list of wireless networks broadcast by routers in neighboring premises fully matches the previously transmitted list of wireless networks broadcast by routers in neighboring premises and the current synthetic password matches the stored synthetic password within specified tolerances, the customer receives confirmation on the customer's computing device that the request for the transfer of funds has been authorized.

7. The system of claim 6, wherein whenever the current list of wireless networks broadcast by routers in neighboring premises only partially matches the previously transmitted list of wireless networks broadcast by neighboring routers, the customer receives confirmation that the request for the transfer of funds has only been authorized to one of pre-defined activities and limited activities.

8. The system of claim 7, wherein the pre-defined activities comprise paying the customer's payees, with maximum limits defined for each payee.

9. The system of claim 7, wherein the limited activities include limiting payments by debit cards according to a category of the payee.

10. The system of claim 6, wherein when the customer is calling from the customer's office at work, the server at the bank requires additional personal information before approving the request.

11. A method for protecting a customer's accounts at a bank from being accessed by fraudsters comprising:
   obtaining a complete list of wireless networks detected by a WiFi adaptor of a customer's computing device;
   using a signal strength associated with each wireless network in an identity verification and authentication application running on a server at the bank to create a stored list of wireless networks from the complete list of wireless networks;
   generating a stored synthetic password using a concatenation of parts of a network name and the signal strength for each wireless network in the stored list of wireless networks;
   using the stored list of wireless networks in the identity verification and authentication application to link the customer's computing device to a geographical location;
   storing the stored list of wireless networks, the stored synthetic password, and linked geographical location on a database on the server;
   performing two-factor authentication by identifying the customer using a customer name and password submitted by the customer and separately without input from the customer obtaining a current list of wireless networks detected by a current computing device using the identity verification and authentication application whenever the identity verification and authentication application determines that an attempt is being made to transfer funds from the customer's account and generating a current synthetic password using a concatenation of parts of a network name and a signal strength for each wireless network in the current list of wireless networks;
   comparing the current list of wireless networks to the stored list of wireless networks and the current synthetic password to the stored synthetic password with the identity verification and authentication application;
   determining with the identity verification and authentication application if the attempt to transfer funds from the customer's account is from the customer's computing device at the linked geographical location by verifying whether there is one of a full match, no match and a partial match between the current list of wireless networks and the stored list of wireless networks and the current synthetic password to the stored synthetic password; and
   authorizing with the identity verification and authentication application full access to the customer's account whenever there is a full match, and denying access to the customer's account whenever there is no match.

12. The method of claim 11, further comprising calculating a verification score whenever there is a partial match.

13. The method of claim 12, further comprising authorizing pre-defined activities whenever the verification score meets a pre-determined threshold.

14. The method of claim 12, further comprising authorizing only limited activities whenever the verification score only meets another threshold that is lower than the pre-determined threshold.

15. The method of claim 11, further comprising requiring additional verification of an identity of a person seeking to access the customer's account at the bank.

16. The method of claim 15, wherein the additional verification comprises recitation of personal knowledge for comparison to previously stored personal knowledge.

17. The system of claim 1, wherein:
   the server stores tolerances for comparing signal strengths in synthetic passwords; and
   the authentication application determines that the current synthetic password fully matches the stored synthetic password when signal strengths in the current synthetic password are within the stored tolerances.

18. The system of claim 1, wherein the server independent of actions of the customer including receipt of a request from the customer periodically queries the driver control ling a network adaptor of a computing device connected to the router to receive an updated complete list of wireless networks detected by the network adaptor, to generate an updated stored list of wire less networks from the updated complete list of wireless networks based on a signal strength associated with each wireless network, to generate an updated stored synthetic password using a concatenation of parts of a network name and a signal strength for each wireless network in the updated stored list of wireless networks, and to store the updated stored list of wireless networks and the updated stored synthetic password.

19. The system of claim 18, wherein the identity verification and authentication application compares the current synthetic password to the updated stored synthetic password.

\* \* \* \* \*